(12) United States Patent
Sheridan

(10) Patent No.: US 7,849,668 B2
(45) Date of Patent: Dec. 14, 2010

(54) ROTOR BRAKE AND WINDMILLING LUBRICATION SYSTEM FOR GEARED TURBOFAN ENGINE

(75) Inventor: William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 1063 days.

(21) Appl. No.: 11/552,750

(22) Filed: Oct. 25, 2006

(65) Prior Publication Data

US 2008/0098712 A1    May 1, 2008

(51) Int. Cl.
    *F02C 7/06* (2006.01)
(52) U.S. Cl. ............ 60/39.08; 184/6.11; 384/473
(58) Field of Classification Search .......... 60/226.1, 60/39.08, 39.091; 184/6.4, 6.11; 384/473; 475/161, 331
See application file for complete search history.

(56) References Cited

U.S. PATENT DOCUMENTS

| | | | | |
|---|---|---|---|---|
| 4,153,141 | A |   | 5/1979 | Methlie |
| 4,195,717 | A | * | 4/1980 | Williams ............ 192/18 A |
| 4,284,174 | A |   | 8/1981 | Salvana et al. |
| 4,858,427 | A | * | 8/1989 | Provenzano ............ 60/39.08 |
| 5,046,306 | A | * | 9/1991 | Borre, Jr. ............ 60/39.08 |
| 5,282,719 | A | * | 2/1994 | McCarty et al. ............ 416/1 |
| 6,312,215 | B1 |   | 11/2001 | Walker |
| 6,672,049 | B2 |   | 1/2004 | Franchet et al. |
| 7,387,189 | B2 | * | 6/2008 | James et al. ............ 184/6.11 |
| 7,571,597 | B2 | * | 8/2009 | Delaloye ............ 60/39.08 |
| 7,662,059 | B2 | * | 2/2010 | McCune ............ 475/159 |
| 2001/0047647 | A1 | * | 12/2001 | Cornet ............ 60/39.02 |
| 2006/0042226 | A1 |   | 3/2006 | Trumper et al. |
| 2006/0223664 | A1 | * | 10/2006 | Duong et al. ............ 475/159 |

OTHER PUBLICATIONS

Application of Dynamic Braking to Mine Hoisting Systems, Thomas D. Barkand and William J. Helfrich, U.S. Department of Labor, Mine Safety and Health Administration.

* cited by examiner

*Primary Examiner*—Michael Cuff
*Assistant Examiner*—Phutthiwat Wongwian
(74) *Attorney, Agent, or Firm*—Carlson Gaskey & Olds PC

(57) ABSTRACT

A journal bearing provides lubrication to planetary gears during windmilling operation of a fan section. A primary oil pump provides oil from an oil supply during driven operation of the fan and a secondary oil pump driven by a generator provides oil during windmilling operation of the fan. The generator acts as a dynamic brake when the aircraft is grounded to prevent windmilling. A switch selects between the primary and secondary oil pump and controls the brake application.

18 Claims, 5 Drawing Sheets

ROTOR BRAKE AND WINDMILLING LUBRICATION SYSTEM FOR GEARED TURBOFAN ENGINE

BACKGROUND OF THE INVENTION

This invention relates to an arrangement for protecting journal bearings of the fan drive systems for turbofan engines by preventing undesired rotation and supplying oil to the journal bearings during rotation.

Turbofan engines include fan sections driven by planetary gear systems. Journal bearings in the systems reduce friction between planetary gears and corresponding support shafts. An oil system supplies oil to lubricate each of the journal bearings. An oil pump maintains pressure within the oil system to ensure each of the journal bearings receives an adequate supply of oil.

Turbofan engines may be used to propel a multi-engine aircraft. In such an aircraft, one of the turbofan engines may shut-down during flight if a fault condition occurs. The oil pump also shuts down when the turbofan engine is not operating. Although the turbofan engine is shut down, airflow through the moving engine may continue to rotate (i.e., windmill) the fan section of the turbofan engine. Without some oil supply, the journal bearings may seize and harm the turbofan engine or prevent operation of the turbofan engine. Preventing windmilling while the aircraft is in the air causes drag as the stationary fan section impedes airflow through the turbofan engine.

When the aircraft is on the ground, airflow through the turbofan engine may cause the fan section to windmill. Without some oil supply while windmilling, the journal bearings may seize and harm the turbofan engine.

Accordingly, it is desirable to provide an arrangement for lubricating journal bearings when the fan section is windmilling during flight, and to prevent the fan section from windmilling when an aircraft is not in flight.

SUMMARY OF THE INVENTION

An example system provides an arrangement for preventing undesired rotation of the fan section of a turbofan engine and for supplying oil to the journal bearings during rotation of the fan section as a result of windmilling.

During engine operation, a fan section for a turbofan engine is driven by a fan drive system that includes a planetary gear system. An oil supply system supplies oil to lubricate the planetary gear system. When the engine in not operating, wind passing over the fan can cause the fan to rotate (i.e., windmill) even though the fan is not being driven by the fan drive system.

The engine includes a three-way switch controlled by an engine control system. The engine control system senses the engine status and the altitude of the aircraft to determine the desired switch position. When the engine is operating and the fan is being driven the switch maintains an "open" position. The oil supply system includes a primary oil pump, which provides oil from an oil supply during driven operation of the fan.

The switch is located between the engine control system and a generator for operating a secondary oil pump. When the engine control system senses an engine shut-down during flight, the switch moves to activate the generator and power the secondary oil pump. The secondary oil pump supplies oil that protects the journal bearings if the fan section begins to windmill.

If the engine is shut down and the engine control system senses that the aircraft is on the ground, the switch is set to apply a brake to prevent rotation of the fan. Specifically, the engine control system moves the switch to short the generator, and to provide a dynamic brake. Because the generator is connected to the fan drive gear system this creates drag on the fan and prevents the fan from rotating.

A spring brake can also be mounted around the rotor shaft. A solenoid, receiving power from the engine control system, maintains the brake in a released position. When the switch moves to the brake application position, the solenoid no longer receives power and the brake is released which clamps the rotor shaft to prevent rotation.

These and other features of the present invention can be best understood from the following specification and drawings, the following of which is a brief description.

DETAILED DESCRIPTION OF THE PREFERRED EMBODIMENT

Figure 1:
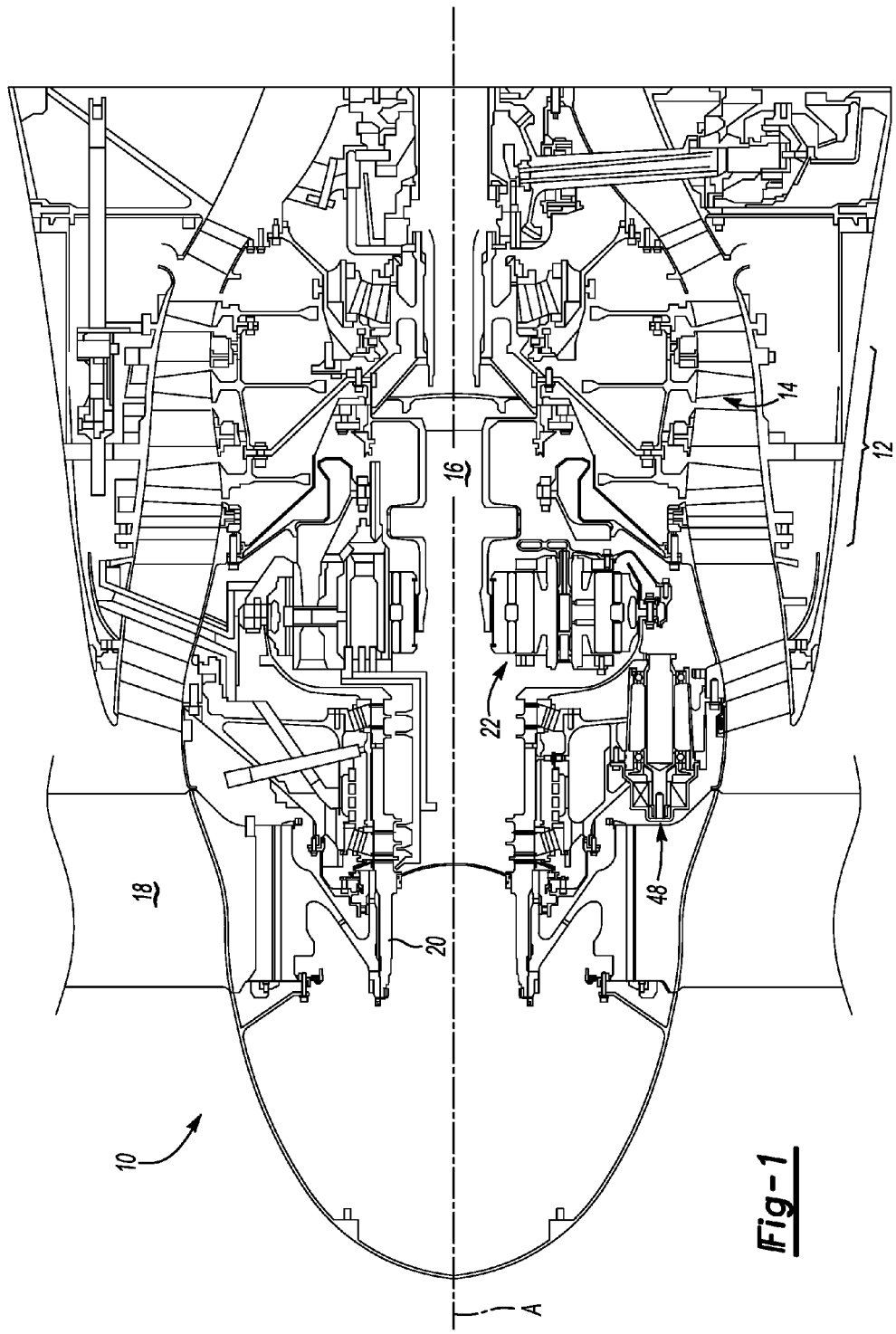
FIG. 1 is a schematic view of a portion of an example turbofan engine.

FIG. 1 is a schematic view of a portion of a turbofan engine 10. The turbofan engine 10 includes a compressor section 12 with compressor blades 14 that rotate about an axis A driven by a turbine shaft 16. A fan section 18 is supported on a fan shaft 20 and driven by the turbine shaft 16 using a planetary gear set 22.

Figure 2:
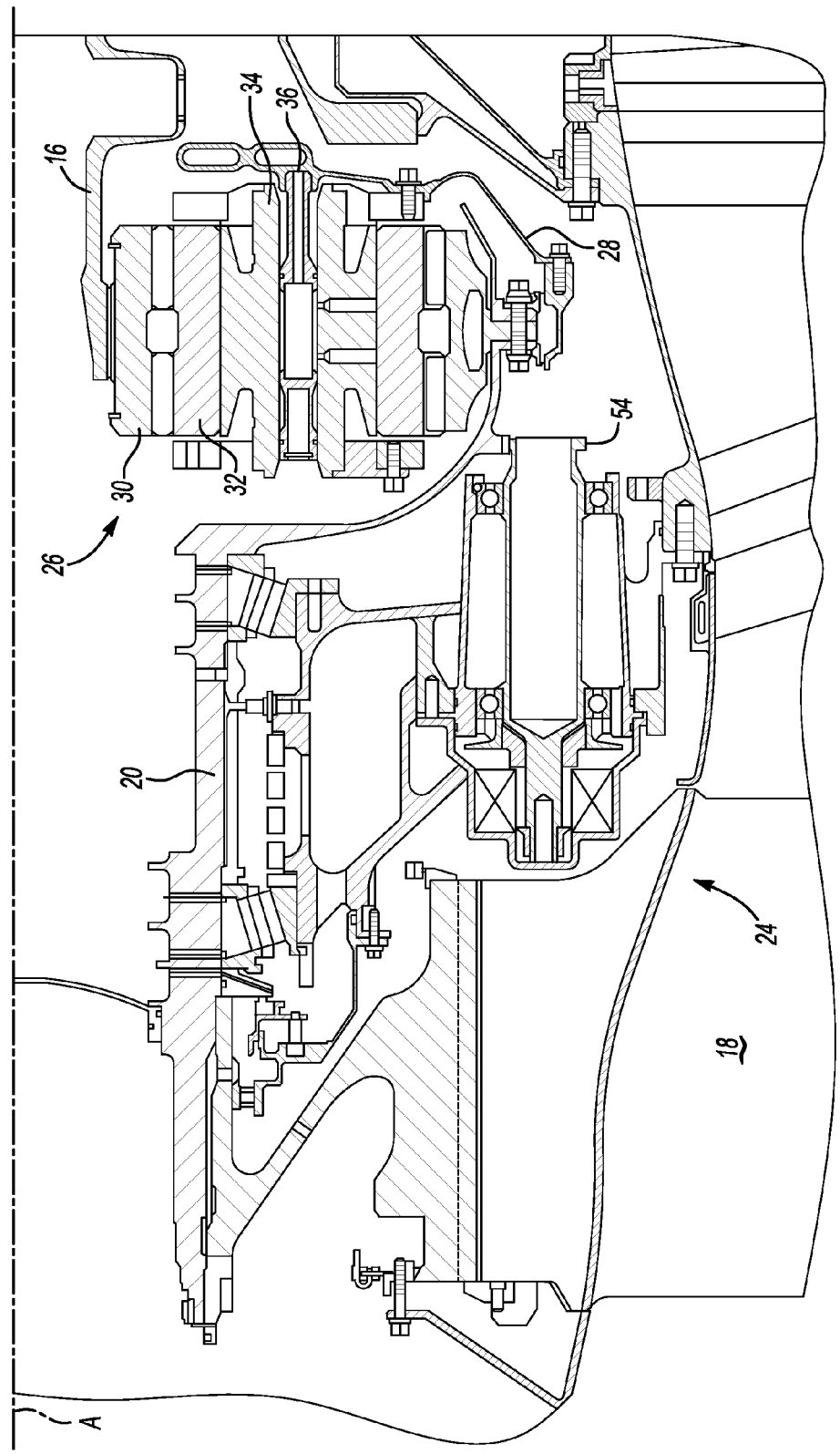
FIG. 2 illustrates an example gear system.

Referring now to FIG. 2, a fan drive gear system 26 rotates a fan shaft 20 to drive the fan section 18. The fan drive gear system 26 includes a sun gear 30 and a plurality of planetary gears 32 that engage the sun gear 30. Journal bearings 34 are located between the planetary gears 32 and support shafts 36 to reduce friction. The planetary gears 32 rotate relative to the journal bearings 34.

Figure 3:
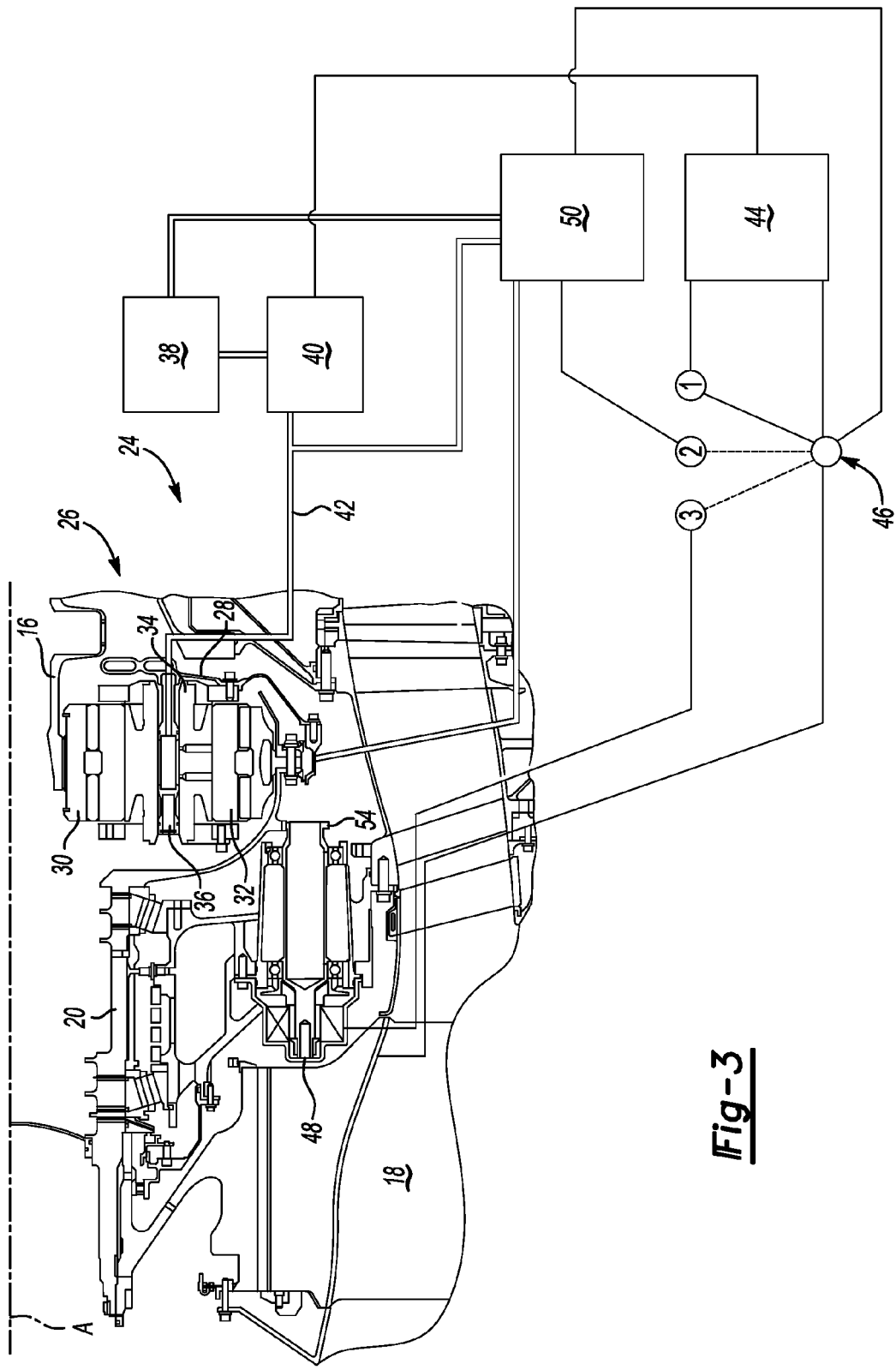
FIG. 3 schematically illustrates a fan drive for a fan system of the example turbofan engine.

When the engine 10 is running, a primary oil pump 40 pumps oil from an oil supply 38 to lubricate the fan drive gear system 26 as shown in FIG. 3. The oil from the primary oil pump 40 communicates along an oil flow path 42 to the journal bearings 34.

An engine control system 44 senses the status of the engine 10 and controls a switch 46 to manage the oil supply to the journal bearings 34 and a fan braking system 24. A person skilled in the art would be able to develop an engine control system 44 capable of monitoring aircraft altitude and status of the engine 10. Using the status of the engine 10 and the altitude of the aircraft, the engine control system 44 determines an appropriate position of the switch 46. In one example, the switch 46 is a three-way switch.

When the engine 10 is operating, and the turbine shaft 16 is driving the fan section 18, the switch 46 is "open" (position 1). In this position, the primary oil pump 40 is powered by the engine 10 and provides oil for the journal bearings 34.

The switch 46 is located between the engine control system 44 and a generator 48 for powering a secondary oil pump 50. When the engine control system 44 senses shut-down of the engine 10 and the aircraft is at a flight altitude, the switch 46 moves to position 2, a position that activates the secondary oil pump 50. In this position, the secondary oil pump 50 provides oil to the journal bearings 34. The oil prevents the fan section 18 from seizing as the fan section 18 windmills when the engine 10 is shut-down, such as when an engine 10 shuts down when the aircraft is moving through the air. The generator 48 provides power to drive the secondary oil pump 50, which communicates oil from the oil supply 38 through the oil flow path 42. Alternatively, the secondary oil pump 50 may utilize oil supply lines separate from the primary oil pump 40.

The engine control system 44 can be set to move the switch 46 to position 2 to activate the secondary oil pump 50 when the engine 10 is cycled on and off. In this manner, the secondary oil pump 50 will be ready for use if needed when the aircraft is in flight.

Various sources of air flowing though the fan section 18 cause windmilling in an unpowered engine 10. For example, wind moving though the fan section 18 when the aircraft is at a ground altitude may cause the fan section 18 to windmill. If the engine 10 is shut down and the engine control system 44 senses that the aircraft is at a ground altitude, the switch 46 may move to position that brakes the fan shaft 20 by inhibiting rotation of the fan section 18. In this example, the engine control system 44 moves the switch 46 to a position 3, a position that shorts the generator 48. The generator 48 is connected to the fan drive gear system 26 through a spur gear 54. Because the generator 48 is connected to the fan drive gear system 26, the fan section 18 must overcome the torque of the generator 48 to rotate. In this manner, the generator 48 brakes the fan section 18, and prevents wind moving though the engine 10 from moving the fan section 18. A person skilled in the art would be able to position the generator 48 to achieve this result.

Figure 4A:
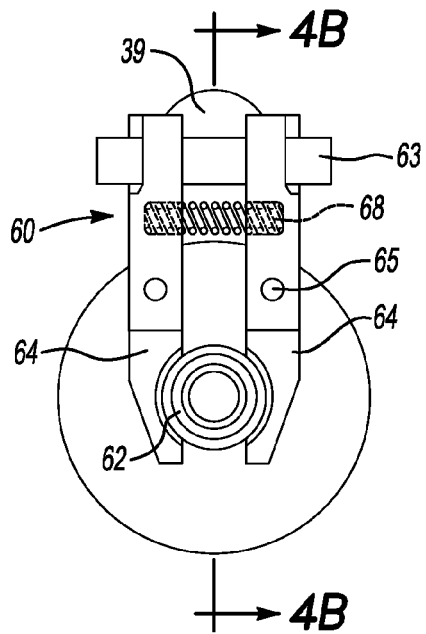
FIG. 4A illustrates an example rotor brake.

In some situations, such a very strong winds, the generator 48 alone is not enough to brake the fan section 18. FIG. 4A illustrates an end view of an example embodiment for braking the generator shaft 62 using a spring brake 60 and a solenoid 39. The spring brake 60 provides braking power to the fan section 18 and may be used if the generator 48 alone is unable to brake the fan section 18.

Figure 4B:
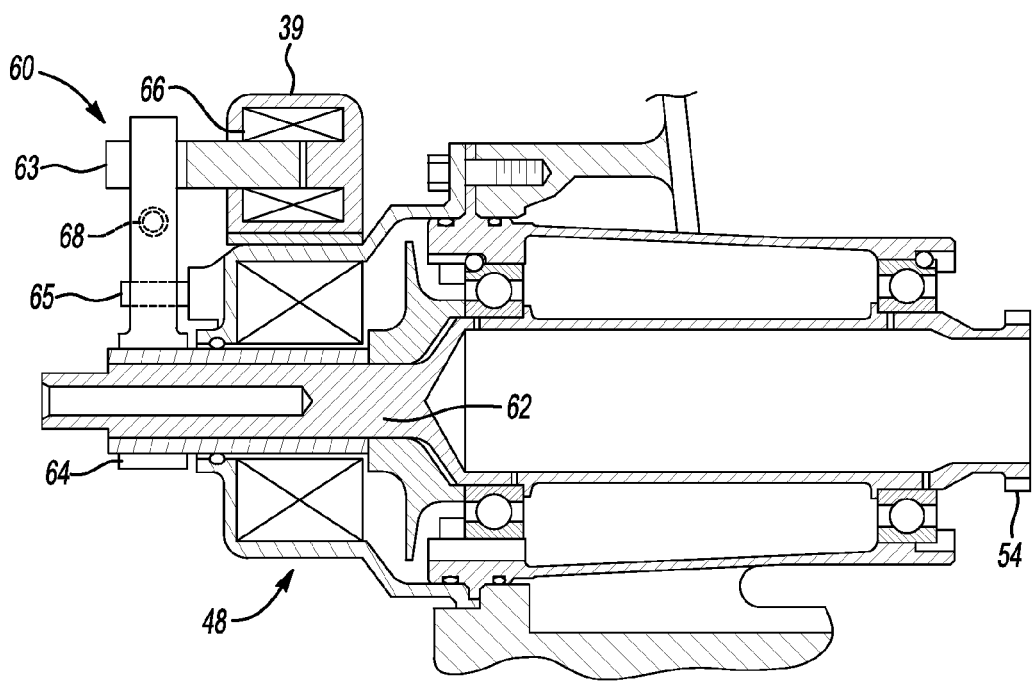
FIG. 4B shows another view of the FIG. 4A brake.
Figure 4C:
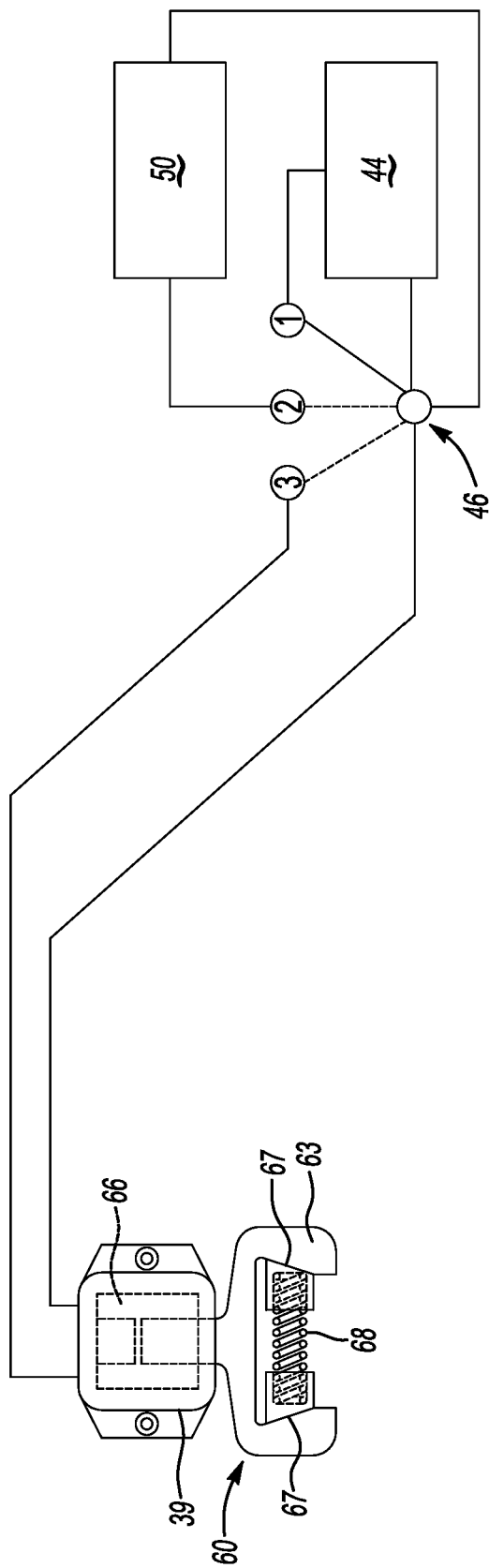
FIG. 4C shows yet another view of the FIG. 4A brake.

FIG. 4B illustrates a cross section of the spring brake 60 and the solenoid 39 mounted to the generator shaft 62. In this example, the spring brake 60 mounts around a generator shaft 62 and is shown in an unbraked position. Energizing a coil 66 within the solenoid 39 creates a magnetic field that urges a wedge lever 63 toward the center of the coil 66. The wedge lever 63 includes angled faces 67, as shown in the top view of FIG. 4C. The angled faces 67 abut the brake pad arms 64, and move the upper portion of the brake pad arms 64 toward each other as the wedge lever 63 is urged toward the center of the coil 66. Moving the brake pad arms 64 toward each other compresses a spring 68, and causes lower portion of the brake pad arms 64 to move away from the generator shaft 62 pivoting about points 65.

The engine control system 44 powers the solenoid 39 to maintain the brake pad arms 64 in a released position by urging the wedge lever 63 toward the center of the coil 66. The solenoid 39 receives power from the engine control system 44 when the switch 46 is in position to operate the primary oil pump 40 (position 1) or the secondary oil pump 50 (position 2). When the switch 46 moves to position that shorts the generator 48 (position 3), such as when the engine 10 is not powered and on the ground, the solenoid 39 no longer receives power. As a result, the solenoid 39 does not urge the wedge lever 63, and the spring 68 forces the brake pad arms 64 to rotate about points 65 to clamp the brake pad arms 64 to the generator shaft 62. The spring 68 causes the brake pad arms 64 to apply a consistent force to the generator shaft 62, even when the brake pad arms 64 are worn. For example, repeated application of the brake pad arms 64 may cause wear on the brake liners (not shown) of the brake pad arms 64. The spring 68 ensures consistent braking force on the generator shaft 62 even if the liners are worn.

As described in the above embodiment, the generator shaft 62 is connected to the fan drive gear system 26 through the spur gear 54. Thus, preventing rotation of the generator shaft 62 using the spring brake 60 prevents rotation of fan section 18.

Although a preferred embodiment of this invention has been disclosed, a worker of ordinary skill in this art may recognize that certain modifications would come within the scope of this invention. For that reason, the following claims should be studied to determine the true scope of coverage available for this invention.

I claim:

1. A turbofan engine comprising:
   a fan section;
   a planetary gear system for driving said fan section;
   a primary supply configured to supply oil to the turbofan engine only when the turbofan engine is operating;
   a secondary supply configured to supply lubricant to the turbofan engine only when the turbofan engine is shut-down; and
   a brake including at least two brake arms and a spring, said brake having a first position permitting rotation of said fan section and a second position preventing rotation of said fan section, wherein powering a solenoid associated with said brake pivots said brake arms away from a shaft to move said brake to the first position, wherein removing power from the solenoid causes said spring to pivot said brake arms toward the shaft to move said brake to the second position.

2. The turbofan engine of claim 1, wherein said brake prevents rotation of said fan section when said engine is shut down and at a ground level altitude.

3. The turbofan engine of claim 1, wherein said brake is a spring loaded brake.

4. The turbofan engine of claim 1, including an engine control system configured to selectively power the solenoid based on at least one of an altitude of said engine or whether said engine is operating.

5. The turbofan engine of claim 1, wherein at least one of said plurality of brake arms clamps a rotor of said fan section when said brake is in the second position.

6. The turbofan engine of claim 1, wherein said at least two brake arms pivot in opposite directions.

7. A turbofan engine comprising:
   a fan section;
   a planetary gear system for driving said fan section;
   a plurality of journal bearings associated with said planetary gear system, wherein a primary supply supplies oil to said plurality of journal bearings during driven gear operation and a secondary supply supplies oil to said plurality of journal beatings during windmilling gear operation;
   a brake to prevent rotation of said fan section; and
   an engine controller having a switch, the switch configured to selectively choose to supply oil only from said primary supply, to supply only oil from said secondary supply, or to apply said brake.

8. The turbofan engine of claim 7, wherein said primary supply is chosen when said engine is driven, said secondary supply is chosen when said engine is shut down and at an elevated altitude, and said brake is chosen when said engine is shut down and at a ground level altitude.

9. The turbofan engine of claim 8, including an engine control system for sensing an altitude and whether said engine is operating.

10. The turbofan engine of claim 7, wherein said secondary supply includes a secondary pump and a secondary supply line in communication with said plurality of journal bearings.

11. The turbofan engine of claim 7, wherein said brake includes a generator that is shorted to provide a dynamic brake.

12. The turbofan engine of claim 7, wherein said brake includes a spring loaded brake that includes a solenoid for selectively applying a clamping brake to a rotatable portion of said fan section.

13. A turbofan engine assembly, comprising:
a fan section;
a planetary gear system configured to drive said fan section;
a journal bearing arrangement associated with said planetary gear system;
an engine controller having a switch, the switch configured to selectively move between a first position that causes oil to be communicated to said plurality of journal bearings only from a primary supply, a second position that causes oil to be communicated to said plurality of journal bearing only from a secondary supply, and a third position that applies a brake to the fan section.

14. The turbofan engine of claim 13, wherein a common oil source supplies oil to said primary supply and said secondary supply.

15. The turbofan engine assembly of claim 13, including an engine control system that moves said switch between the first position, the second position, and the third position, said engine control system configured to move said switch depending on an operating condition of the engine.

16. The turbofan engine assembly of claim 15, wherein said engine control system moves said switch to the first position when said engine is driven, the second position when said engine is shut down and at an elevated altitude, and the third position when said engine is shut down and at a ground level altitude.

17. The turbofan engine assembly of claim 13, wherein the brake comprises a generator that is shorted to provide a dynamic brake.

18. The turbofan engine of claim 17, wherein the generator powers a communication of fluid from the secondary supply.

* * * * *